(12) United States Patent
Chung

(10) Patent No.: US 7,274,556 B2
(45) Date of Patent: Sep. 25, 2007

(54) DISPLAY SET

(75) Inventor: Wen-Lon Chung, Pan-Chiao (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 443 days.

(21) Appl. No.: 10/904,592

(22) Filed: Nov. 18, 2004

(65) Prior Publication Data

US 2005/0111173 A1  May 26, 2005

(30) Foreign Application Priority Data

Nov. 20, 2003 (TW) .............................. 92132549 A

(51) Int. Cl.
*H05K 5/00* (2006.01)
*H05K 7/00* (2006.01)
*F16L 3/00* (2006.01)

(52) U.S. Cl. ...................... 361/681; 361/682; 361/683; 248/917; 248/121

(58) Field of Classification Search ................ 248/146, 248/917, 121; 312/223.2, 223.3; 345/104, 345/87; 361/681, 682, 683, 678; 211/85.26
See application file for complete search history.

(56) References Cited

U.S. PATENT DOCUMENTS

| | | | |
|---|---|---|---|
| 5,144,290 A * | 9/1992 | Honda et al. ................ 345/156 |
| 5,751,548 A * | 5/1998 | Hall et al. ................... 361/686 |
| 6,290,534 B1 * | 9/2001 | Sadler ......................... 439/534 |
| 6,381,125 B1 * | 4/2002 | Mizoguchi et al. .......... 361/682 |
| 6,502,792 B1 * | 1/2003 | Cho et al. ..................... 248/121 |
| 6,702,238 B1 * | 3/2004 | Wang ...................... 248/125.8 |
| 6,712,321 B1 * | 3/2004 | Su et al. ................. 248/123.11 |
| 6,997,422 B2 * | 2/2006 | Sweere et al. .......... 248/123.11 |
| 7,168,665 B2 * | 1/2007 | Hong et al. .............. 248/125.1 |
| 2004/0113031 A1 * | 6/2004 | Sung .......................... 248/146 |

* cited by examiner

*Primary Examiner*—Lisa Lea-Edmonds
*Assistant Examiner*—Anthony M Haughton
(74) *Attorney, Agent, or Firm*—Winston Hsu

(57) ABSTRACT

A display set has a display panel, a support fixed to the display panel, and a base detachably engaged with the support. The support has at least a latch hole. The base has a slot for accommodating the support, at least a latch corresponding to the latch hole of the support, a first spring mounted on the latch, a rib corresponding to the latch for controlling the movement of the latch, and a button for controlling the movement of the rib.

16 Claims, 5 Drawing Sheets

DISPLAY SET

BACKGROUND OF INVENTION

1. Field of the Invention

The present invention relates to a display set, and more particularly, to a display set having a detachable base.

2. Description of the Prior Art

Please refer to FIG. 1, which is a schematic diagram of a display set 10 according to the prior art. The display set 10 comprises a display panel 12, a base 14, and a support 16 for fixing the display panel 12 to the base 14.

Since the display panel 12 is perpendicularly fixed to and cannot be separated from the base 14, the display set 10 has a big bulk and needs a large container for storage.

SUMMARY OF INVENTION

It is therefore a primary objective of the claimed invention to provide a display set having a detachable base and having a small bulk.

According to the claimed invention, the display set includes a display panel, a support and a base detachably fixed to the support. Since the base can be separated from the support and therefore from the display panel, the display set has a small bulk for storage.

Another objective of the claimed invention is to provide a display set having a detachable base, so as to reduce the storage space occupied by the base and to increase the shipment capability for loading the display set.

The third objective of the claimed invention is to provide a display set having a detachable base that can be separated from a support of the display set without tools.

According to the claimed invention, the display set includes a display panel, a support fixed to the display panel, and a base detachably fixed to the support. The support includes at least a latch hole. The base includes a slot, a latch installed corresponding to the latch hole of the support, a first spring mounted onto the latch, a rib having a first end facing the door lock and a second end, and a button facing the second end of the rib.

In the preferred embodiment of the invention, when the support is engaged with the base, the support is accommodated in the slot and the latch is inserted into the latch hole; wherein when the support is desired to be separated from the base, the button is pushed downward from an initial position to drive the rib to move toward a first direction, and the rib drives the latch to move toward a second direction to compress the first spring and to separate the latch from the latch hole so as to separate the support from the base, and when the button is released, the compressed first spring bounces and drives the latch to move toward a direction opposite to the first direction and the latch correspondingly drives the rib to move toward a direction opposite to the second direction, so that the button is moved back to the initial position.

In the preferred embodiment of the present invention, the base of the display set further includes a second spring mounted onto the button. When the button is pressed, the second spring is compressed, and when the button is released, the second spring bounces and drives the button back to the initial position.

Since the base is detachable from the display panel, the display set has a small bulk for storage. Additionally, the base can be separated from the support with the button pressed, so that time to compose the display set is short.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
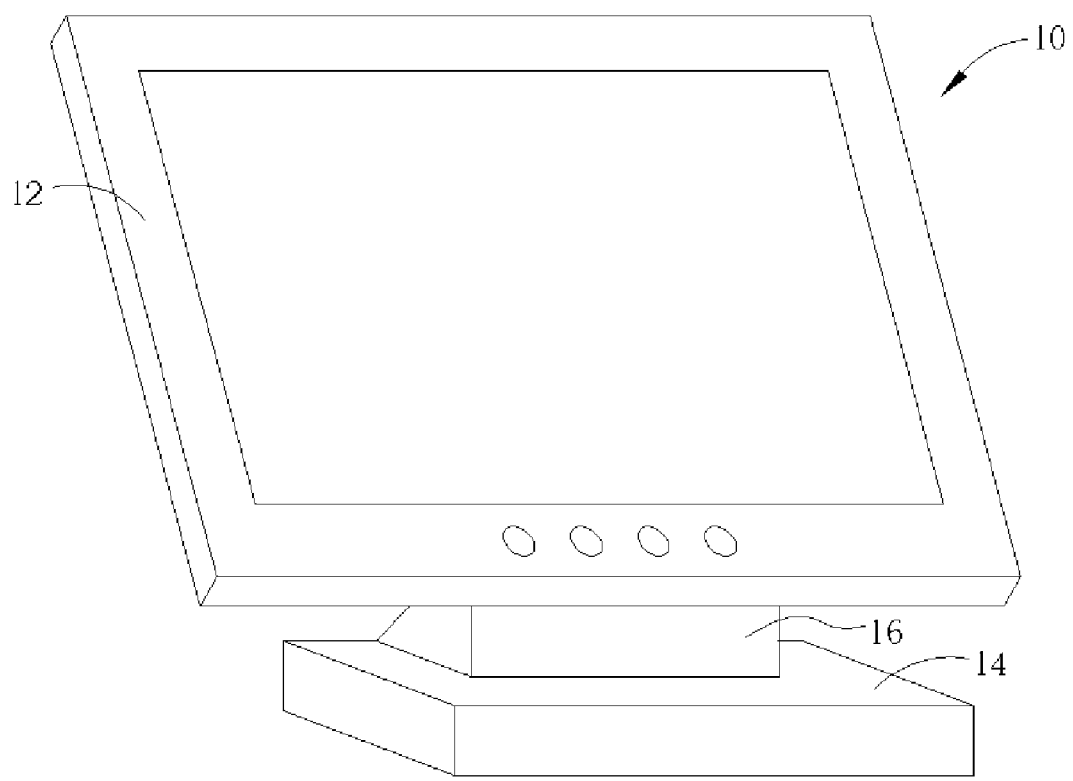
FIG. 1 is a schematic diagram of a display set according to the prior art.
Figure 2:
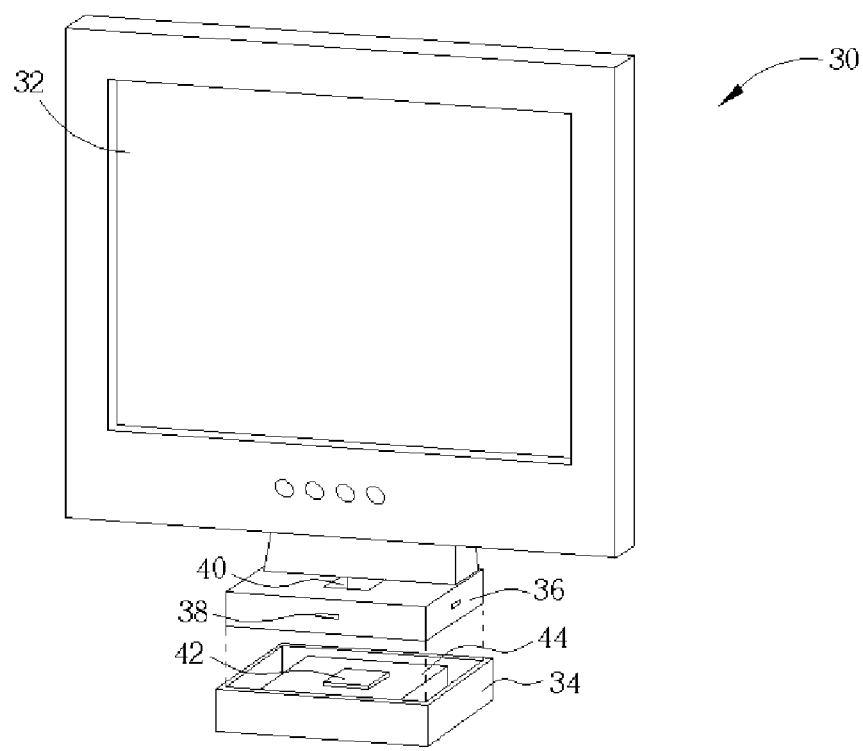
FIG. 2 is a schematic diagram of a display set of the preferred embodiment according to the present invention.

Please refer to FIG. 2, which is a schematic diagram of a display set 30 of the preferred embodiment according to the present invention. The display set 30 comprises a display panel 32, a support 36 fixed to the display panel 32, and a base 34 detachably engaged with the support 36. The support 36 comprises four latch holes 38 and a push button opening 40. The base 34 comprises a push button 42 and a slot 44 for accommodating the support 36. The base 34 can have various shapes and should not be construed as limited by the appended drawings.

Figure 3:
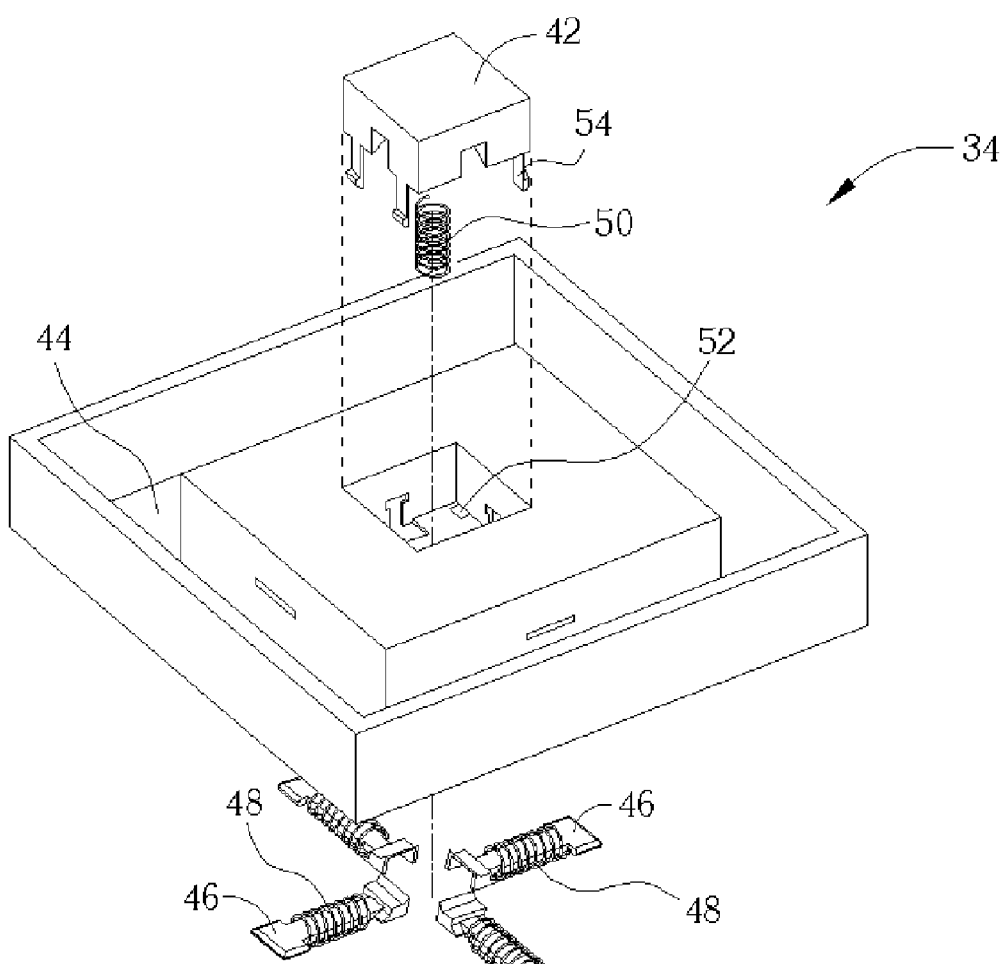
FIG. 3 is an exploded view of a base of the display set shown in FIG. 2 according to the present invention.

Please refer to FIG. 3, which is an exploded view of the base 34 of the display set 30 according to the present invention. The base 34 comprises four latches installed corresponding to the four latch holes 38 of the support 36, four latch springs 48 respectively mounted on the four latches 46, a push button spring 50 installed inside the push button 42, and four fixing holes 52. The push button 42 comprises four fixing devices 54 for inserting into the corresponding fixing holes 52 and fixing the push button 42 to the base 34.

Figure 4:
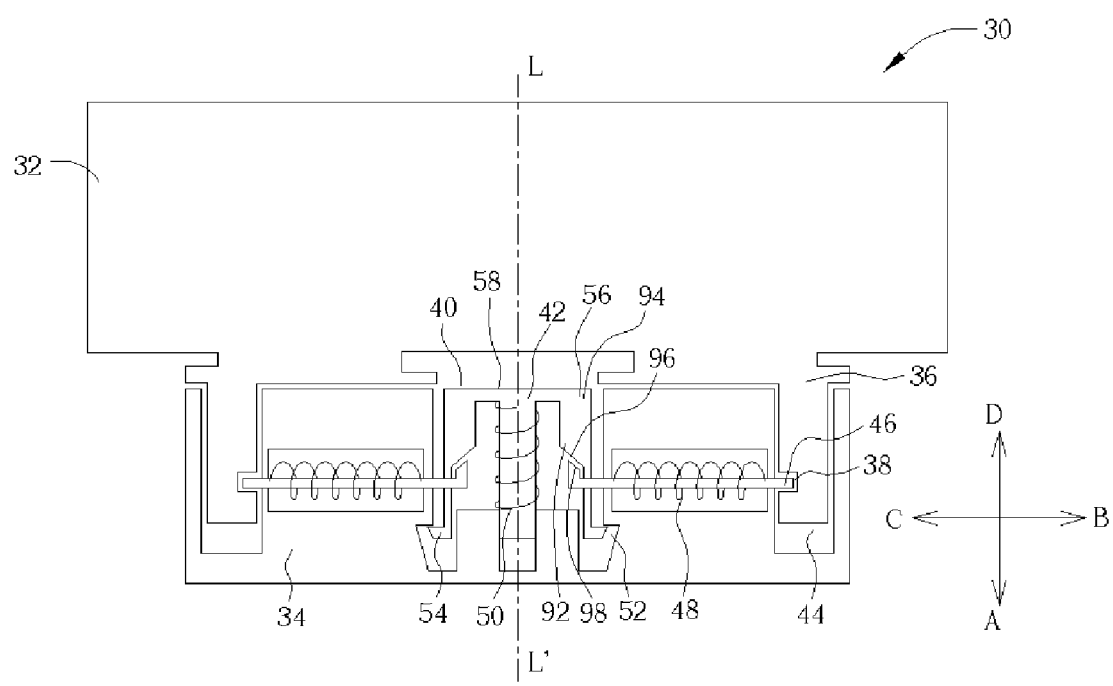
FIG. 4 is a side view of the display set shown in FIG. 2 when a support is engaged with the base shown in FIG. 3 according to the present invention.

Please refer to FIG. 4, which is a side view of the display set 30 when the support 36 is engaged with the base 34 according to the present invention. As shown in FIG. 4, the support 36 is accommodated in the slot 44 and the latch 46 is inserted into the latch hole 38. The base 34 further comprises four ribs 56 installed corresponding to the latches 46 for controlling the movement of the latches 46. The rib 56 comprises a first end 92 facing the corresponding latch 46 and a second end 94 facing the push button 42. The rib 56 further comprises a first ramp 96 installed on the first end 92. The latch 46 comprises a second ramp 98 installed adjacent to the first end 92 of the rib 56 and facing the first ramp 96. The rib 56, at least a portion of the latch 46, and the push button spring 50 are all accommodated in the push button 42. As shown in FIG. 4, since the base 34 has a symmetric structure according to a central line LL', only the components of the base 34 at the right side of the central line LL' are described hereafter to illustrate how the support 36 is engaged with and separated from the base 34.

The operation of separating the support 36 from the base 34 is described as follows. The display set 30 is assumed to have the support 36 engaged with the base 34 and the latch 46 inserted into the latch hole 38 at the beginning. The push button 42 is pressed and moved from an initial position toward a first direction A, and the push button 42 moving toward the first direction A drives the rib 56 to move toward the first direction A too and compresses the push button spring 50 accordingly. Since the first ramp 96 of the first end 92 of the rib 56 faces the second ramp 98 of the latch 46, the rib 56 moving toward the first direction A drives the latch 46 to move toward a third direction C to compress the latch spring 38 and to separate the latch 46 from the latch hole 38. Therefore, the support 36 is separated from the base 34 in the end.

The operation of engaging the support 36 with the base 34 is described as follows. Press the push button 42 and place the support 36 in the slot 44. Then release the push button 42 so that the initially compressed latch spring 48 drives the latch 46 to move toward a second direction B opposite to the third direction C, and the latch 46 moving toward the second direction B drives the rib 56 as well as the push button 42 to move toward a fourth direction D opposite to the first direction A and to have the latch 46 inserted into the latch hole 38 of the support 36. Therefore, the support 36 is engaged with the base 34 in the end and the push button 42 is moved back to the initial position.

The display set 30 shown in FIG. 4 comprises both the latch spring 48 and the push button spring 50. However, a display set of the present invention can selectively comprise only the latch spring 48, since the push button spring 50 is installed to have a primary function for reducing the time for the push button 42 moving back to the initial position and therefore it is quicker for the latch 46 to insert into the latch hole 38.

In the display set 30 shown in FIG. 2, the support 36 comprises four latch holes 38 and the base 34 comprises four corresponding latches 46. However, a display set of the present invention can comprise the any number of pairs of the latches and the latch holes.

In the display set shown in FIG. 3, the support 36 has a shape of rectangular prism and the base 34, for accommodating the support 36, has a rectangular shape correspondingly. In a display set of the present invention, the support can have a shape of any forms such as a cylinder, as long as a slot installed on a base of the display set has a corresponding shape such as circle. The cylindrical support 36 of a display set according to the present invention can comprise three latch holes equally distributed and installed on the circumference of the cylindrical support 36 (e.g. every latch hole is spaced at every 120° of the cylinder). The display set having the cylindrical support can have a base to have three latches corresponding to the latch holes of the support.

In the display set 30 shown in FIG. 2, the latch 46 of the base 34 is in cylindrical shape and the latch 46 has a first end for inserting into the latch hole 38 of the support 36 to have a rectangular shape. Alternatively, the latch 46 can have a shape of rectangular prism or cylinder having a cross section, and the first end of the latch 46 can have a circular shape. Of course, the latch hole 38 of the support 36 has to have a shape corresponding to the latch 46. Moreover, both the base 34 and the support 36 can be made of plastic or metal.

Figure 5:
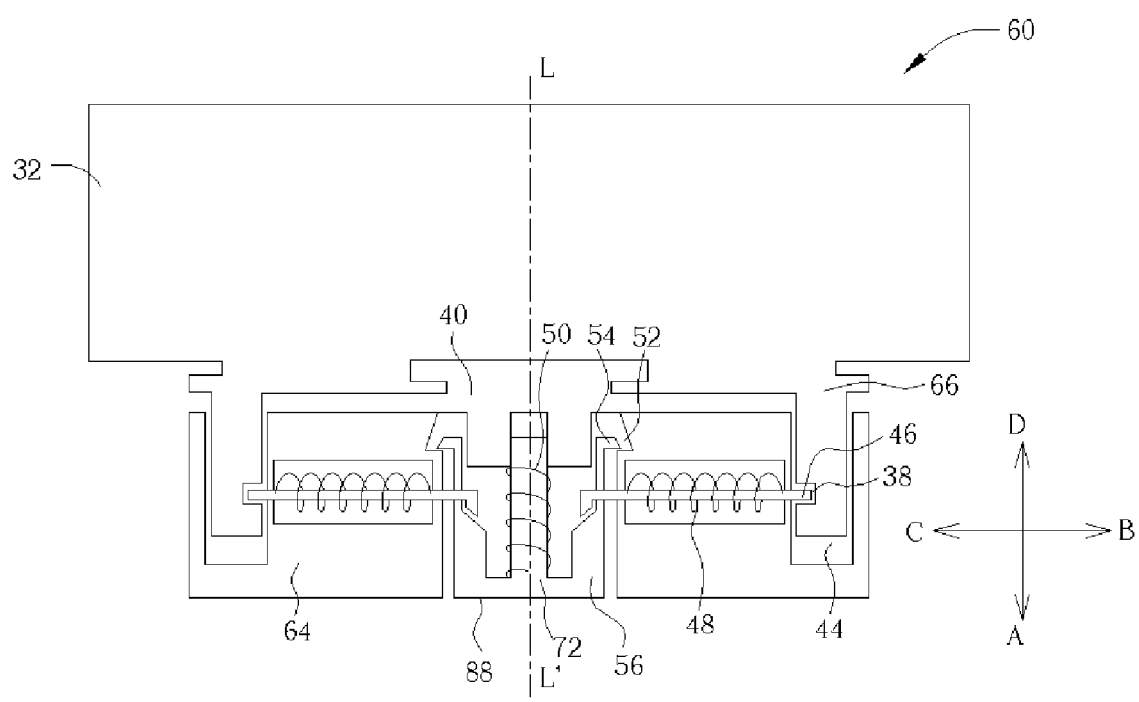
FIG. 5 is a side view of another display set of a second embodiment when a support is engaged with a base of the display set according to the present invention.

In the display set 30 shown in FIG. 2, the push button 42 has a contact surface 58 facing the display panel 32 for a user to touch conveniently. The push button 42 is installed on a front surface of the base 42. In a display set according to the present invention, a push button for controlling a support engaging with and separating from a base can be installed on any position of the base, for example on a back surface of the base. Please refer to FIG. 5, which is a side view of a display set 60 of a second embodiment when a support 60 is engaged with a base 64 according to the present invention. In contrast to the display set 30 shown in FIG. 2, the display set 60 has a push button 72 of the base 64 to have a contact surface 88 installed on a back surface of the base 64. Since the display set 60 has both a structure and procedures of the support 66 engaging with and separating from the base 64 are similar to those of the display set 30, further description is hereby omitted.

In contrast to the prior art, the present invention can provide a display set comprising a display panel, a support and a base. Since the base is detachably fixed to the display panel, the display set therefore has a small bulk and needs only a small container for accommodation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display set comprising:
a display panel;
a support fixed to the display panel, the support comprising at least a latch hole; and
a base detachably engaged with the support, the base comprising:
a slot;
at least a latch installed corresponding to the latch hole of the support;
a first spring mounted on the latch;
a rib having a first end and a second end, the first end facing the latch, and the rib not being connected to the latch; and
a button facing the second end of the rib;
wherein when the support is engaged with the base, the support is accommodated in the slot and the latch is inserted into the latch hole;
wherein when the support is desired to be separated from the base, the button is pushed downward from an initial position to drive the rib to move toward a first direction, and the rib drives the latch to move toward a second direction perpendicular to the first direction to compress the first spring and to separate the latch from the latch hole so as to separate the support from the base, and when the button is released, the compressed first spring bounces and drives the latch to move toward a direction opposite to the second direction and the latch correspondingly drives the rib to move toward a direction opposite to the first direction, so that the button is moved back to the initial position.

2. The display set of claim 1, wherein the first end of the rib comprises a first ramp and the latch comprises a second ramp contacting the first ramp, and when the button is pushed downward to drive the rib to move toward the first direction, the first ramp of the rib slides along the second ramp of the latch to drive the latch to move toward the second direction so as to separate the latch from the latch hole.

3. The display set of claim 1, wherein the base further comprises a second spring installed inside the button, the second spring is compressed when the button is pushed, and the compressed second spring drives the button to move back to the initial position when the button is released.

4. The display set of claim 3, wherein the button is hollow for accommodating the rib, at least a portion of the latch, and the second spring.

5. The display of claim 1, wherein the base further comprises at least a fixing hole and the button comprises a fixing device for inserting button itself into the fixing hole and for fixing the button to the base.

6. The display set of claim 1, wherein the base further comprises a front surface and a back surface, and the button is installed on the front surface of the base.

7. The display set of claim 6, wherein the support further comprises a button opening for exposing the button when the support is engaged with the base.

8. The display set of claim 1, wherein the base further comprises a front surface and a back surface, and the button is installed on the back surface of the base.

9. The display set of claim 1, wherein the base comprises a plurality of latches.

10. The display set of claim 1, wherein the slot is rectangular.

11. The display set of claim 1, wherein the slot is circular.

12. The display set of claim 1, wherein the latch is in the shape of cylinder.

13. The display set of claim 1, wherein the latch is in the shape of a rectangular prism.

14. The display set of claim 1, wherein the latch is in the shape of a cross.

15. The display set of claim 1, wherein the base is made of metal.

16. The display set of claim 1, wherein the base is made of plastic.

* * * * *